US010597868B2

(12) United States Patent
Foerg

(10) Patent No.: US 10,597,868 B2
(45) Date of Patent: Mar. 24, 2020

(54) SEALING STRIP FOR SEALING JOINTS BETWEEN ELEMENTS, AND METHOD FOR PRODUCING A SEALING STRIP

(71) Applicant: HILTI AKTIENGESELLSCHAFT, Schaan (LI)

(72) Inventor: Christian Foerg, Dillishausen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/302,163

(22) PCT Filed: May 15, 2017

(86) PCT No.: PCT/EP2017/061577
§ 371 (c)(1),
(2) Date: Nov. 16, 2018

(87) PCT Pub. No.: WO2017/207253
PCT Pub. Date: Dec. 7, 2017

(65) Prior Publication Data
US 2019/0145094 A1   May 16, 2019

(30) Foreign Application Priority Data
Jun. 2, 2016 (EP) .................................. 16172573

(51) Int. Cl.
*E04B 1/68* (2006.01)
*E04B 1/94* (2006.01)
(52) U.S. Cl.
CPC ............ *E04B 1/6813* (2013.01); *E04B 1/948* (2013.01); *B32B 2307/3065* (2013.01)
(58) Field of Classification Search
CPC ........ E04B 1/68; E04B 1/6813; E04B 1/6812; E04B 1/948; B32B 2307/3065
See application file for complete search history.

(56) References Cited

U.S. PATENT DOCUMENTS 3,634,565 A * 1/1972 Schaerer ................... E06B 3/16
264/267
4,740,256 A * 4/1988 Vosberg ................ B29C 53/265
156/73.1
(Continued)

FOREIGN PATENT DOCUMENTS

DE       23 517 23       4/1974
DE   10 2004 056 914    6/2006
(Continued)

OTHER PUBLICATIONS

International Search Report mailed in PCT/EP2017/061577 dated Jul. 12, 2017, with Engish translation.
(Continued)

*Primary Examiner* — Christine T Cajilig
(74) *Attorney, Agent, or Firm* — Grüneberg and Myers PLLC

(57) ABSTRACT

The invention relates to a sealing strip (1) for sealing a joint (11) between two elements (12), in particular between building components, wherein the sealing strip (1) extends in a longitudinal direction (L) and has, in cross-sectional profile, two fastening portions (2) between which there are provided two separate adjacent sealing portions (3) which are separated from one another by a predetermined bending point (4) which runs in the longitudinal direction (L), wherein the sealing portions (3) each have a chamber (6) which is filled with a compressible foam, wherein the sealing strip (1) is formed from a sheet material (9).

11 Claims, 4 Drawing Sheets

(56) References Cited

U.S. PATENT DOCUMENTS

| | | | | |
|---|---|---|---|---|
| 4,967,527 | A | * | 11/1990 | Gohlke .................. E04B 1/948 250/517.1 |
| 5,273,698 | A | * | 12/1993 | Thary ................... B29C 43/184 156/79 |
| 5,296,182 | A | * | 3/1994 | Thary ................... A41D 27/08 264/46.5 |
| 5,326,609 | A | * | 7/1994 | Gohlke .................. B32B 15/04 428/76 |
| 6,112,488 | A | | 9/2000 | Olson et al. |
| 2002/0119285 | A1 | * | 8/2002 | Arnold ............... B29D 99/0053 428/119 |
| 2003/0124278 | A1 | * | 7/2003 | Clark ....................... B32B 7/02 428/35.7 |
| 2007/0289235 | A1 | | 12/2007 | Hansen et al. |
| 2008/0032114 | A1 | * | 2/2008 | Squires .................. B32B 27/12 428/308.4 |
| 2011/0113709 | A1 | * | 5/2011 | Pilz ........................ E04B 1/948 52/232 |
| 2011/0277413 | A1 | * | 11/2011 | Emmons ............... E04B 1/6812 52/514.5 |
| 2015/0068139 | A1 | | 3/2015 | Witherspoon |

FOREIGN PATENT DOCUMENTS

| | | | | |
|---|---|---|---|---|
| DE | 20 2011 050 191 | | 8/2012 | |
| DE | 20 2012 104 826 | | 3/2014 | |
| EP | 0 347 865 | | 12/1989 | |
| EP | 3093407 A1 | * | 11/2016 | ........... B29C 44/342 |
| EP | 3252244 A1 | * | 12/2017 | ............. E04B 1/948 |
| GB | 1 434 649 | | 5/1976 | |
| GB | 2 472 402 | | 2/2011 | |
| GB | 2 376 706 | | 12/2012 | |

OTHER PUBLICATIONS

Written Opinion of the International Searching Authority mailed in PCT/EP2017/061577 dated Jul. 12, 2017.

* cited by examiner

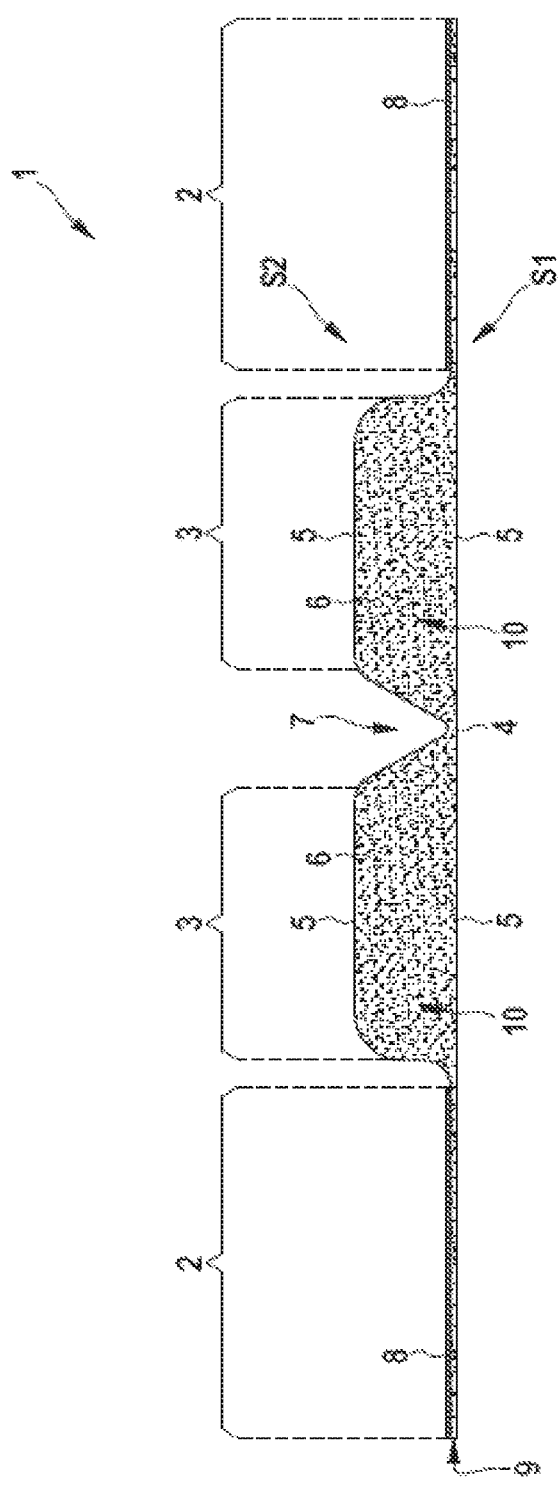

SEALING STRIP FOR SEALING JOINTS BETWEEN ELEMENTS, AND METHOD FOR PRODUCING A SEALING STRIP

This application is a National Stage entry under § 371 of international Application No. PCT/EP2017/061577, filed on May 15, 2017, and claims priority to European Patent Application No. 16172573.4, filed on Jun. 2, 2016, the entire contents of which are hereby incorporated as reference.

TECHNICAL FIELD

The invention relates to measures for sealing joints between two building elements, especially building components, such as building ceilings, building walls, drywalls or the like.

TECHNICAL BACKGROUND

During construction or mounting of building components, these are usually not set directly against one another but instead a joint is left in order to be able to absorb or compensate for relative movements between the building components. In order to prevent the passage of fire gases or flames through the joint in the fire situation, this is usually sealed by suitable measures. As an example, sealing may be undertaken with a sealing strip, which consists entirely or partly of an intumescent material.

From US publication 2015/068139 A1, a connecting system is known that has an expanding foam strip, in which a fire-resistant material is embedded.

From GB publication 2376706, an intumescent strip is known for affixing on a flat surface with two channels, which are spaced apart from one another and run in longitudinal direction in an extruded carrier material, and in which intumescent material is respectively introduced.

From U.S. Pat. No. 6,112,488 A, a sealing strip of a fire-resistant intumescent sealing material is known, wherein one of the main faces is affixed on a fire-resistant material separating layer and a further of the main faces is designed to be affixed to a connecting part of a building. One of the main faces is equipped with an adhesive and at least one of the fire-resistant separating layers is joined to one part of one of the main faces of the sealing strip.

From DE publication 23 517 23, an impervious lining of an expansion joint is known that has a fire-stopping, elastic and permanent part, a watertight part and an upper joint covering that is impervious to gas.

DE publication 20 2012 104 826 U1 describes a joint-sealing tape for sealing a building-structure joint between two building parts. The sealing tape has a carcass of a resilient soft-foam material as well as two oppositely disposed broad sides of the sealing tape for contact with the two joint flanks formed by the two building parts. The joint-sealing tape has a material course of a material that counteracts external environmental influences and that expands its volume greatly under the effect of environmental influences. The joint-sealing tape therefore has a multi-course structure, and fixation takes place within the joint.

GB publication 2472402 discloses a smoke-sealing and fire-sealing arrangement having an array of sealing elements on a fastening base.

However, the foregoing sealing strips have disadvantages for their mounting and/or their movement absorption, and it is therefore desirable to provide an improved sealing strip, which is easier to handle and which permits good movement absorption. Furthermore, the prior art process for production of sealing strips is often laborious, and it is therefore a further object of the present invention to provide an improved method for production of such a sealing strip.

DESCRIPTION OF THE INVENTION

These objects are achieved by the sealing strip for sealing joints between building elements according to claim 1 as well as by the method for producing sealing strips according to the secondary claims.

Further configurations are specified in the dependent claims.

According to a first aspect, a sealing strip is provided for sealing a joint between two building elements, especially between building components, wherein the sealing strip extends in a longitudinal direction and in cross-sectional profile has two fastening portions, between which two separate adjacent sealing portions are provided that are separated from one another by a predetermined bending site running in longitudinal direction, wherein the sealing portions respectively have a chamber filled with a compressible foam, wherein the sealing strip is formed from a film material.

One idea of the foregoing sealing strip consists in providing it as an elastic tape-like sealing element, which has two sealing portions, which extend in a manner separated from one another in longitudinal direction, are directly adjacent to one another, are filled with a compressible foam and are surrounded by a flexible film material. A predetermined bending site, which runs in longitudinal direction and at which the sealing portions can be pivoted toward one another, is situated between the sealing portions. Thus, during insertion into a joint between two building elements, the sealing portions can be folded onto one another and, by virtue of the flexible film material, can be easily deformed in the process, so that the sealing portions can be easily adapted to the joint cross section.

Due to the separation of the sealing portions merely by a predetermined bending site, the joint is substantially closed completely over its entire width, without forming a noteworthy weak point. Due to the combination of the predetermined bending site between the sealing portions and the envelope of the compressible foam with the film material, the sealing strips are also able to absorb changes in the width of the joint within a broad range, without compromising the imperviousness.

Furthermore, the foam may be provided with an elastic polyurethane foam and in particular have a density of 40-400 kg/m³. A foam material for the sealing portions with these properties has proved advantageous in terms of manipulability and sealing properties. The foam material may be an open-cell or closed-cell foam material or a foam material on a silicone basis.

It may be provided that the sealing portions are formed immediately adjacent to one another. Thereby reliable sealing in the region between the sealing portions is also achieved after introduction into the joint.

According to one embodiment, the sealing portions may be designed to be tapered toward the predetermined bending site, in order to form a recess, especially a wedge-shaped recess, between the sealing portions. This reduces the compression of the elastic material in the region of the predetermined bending site while it is being folded together vigorously along the predetermined bending site.

Furthermore, the sealing portions are able to protrude only above a main face of the sealing strip.

In particular, the fastening portions may be provided with adhesive areas, especially with hotmelt or acrylic adhesive, on that side of the sealing strip on which the sealing portions protrude. The fastening portions situated outside the sealing portions may therefore be equipped with an adhesive area, in order to bond the sealing strip adhesively to faces, outside the joint, of the building elements between which the fire-protection joint is formed, so that the sealing portions project into the joint and seal it completely.

It may be provided that the film material is equipped with structural reinforcement, which in particular is formed as an affixed or embedded screen or mesh structure.

It may also be provided that the film material completely envelops the sealing strip.

According to a further aspect, an arrangement is provided comprising:
  the above sealing strip;
  a joint between two building elements,
  wherein the fastening portions of the sealing strip are adhesively bonded to the rim regions of the building elements adjoining the joint, so that the sealing portions project into the joint in a condition folded together at least partly around the predetermined bending site.

According to a further aspect, a method for producing a sealing strip, especially the above sealing strip, is provided, with the following steps:
  provision of an elongated film tape;
  introduction of liquid, uncured foam material onto the film tape;
  bending the film tape over in a manner transverse to the longitudinal direction of the film tape, in order to form a film tube; and
  pressing the film tube with a press punch, so that film portions overlapping one another at the fastening portions and at the predetermined bending site are joined to one another, especially welded, and the foam material collects prior to curing in adjacent chambers, in order to form the sealing portions.

One idea of the foregoing production method consists in providing a film tube, which is filled with a quantity of liquid foam material that is still liquid. By stamping with a forming punch, rim regions of the cross-sectional profile of the film tube are pressed together, so that no foam or only a minimum quantity thereof remains between the pressed-together parts of the film tube. This minimum quantity of foam may be used advantageously as adhesive for bonding the rim regions of the cross-sectional profile of the film tube. In this case, the forming punch prevents foaming into the rim regions. Furthermore, by means of a ridge-shaped punch portion, the foam filling is separated along the longitudinal direction, so that the predetermined bending site is formed in the middle of the sealing profile of the sealing strip by the fact that the opposite portions of the film tube adhere to one another. In this way, chambers in which the liquid foam material foams and cures are formed between the rim regions and the predetermined bending site. In this way, a sealing strip having a sealing profile as described hereinabove may be formed, which has to be equipped only with the adhesive area at the fastening portions, in order to form the sealing strip.

Furthermore, a layer of the foam material may remain on the fastening portions between the film portions, in order to reinforce the fastening portions.

According to a further aspect, a method for producing a sealing strip, especially the above sealing strip, is provided, with the following steps:

provision of an elongated first film tape in a forming punch having depressions adjacent to one another;
application of liquid, uncured foam material in the depressions of the first film tape;
application of a second film tape onto the first film tape, so that the film tapes are joined to one another at fastening portions and along a predetermined bending site, and the foam material is enclosed in chambers formed by the depressions.

One idea of the foregoing alternative production method consists in joining two films to one another, wherein a first film is placed in a forming profile that has two depressions which are separated from one another only by a ridge. Now liquid foam material is introduced into the hollows formed in this way and a further film is joined to the first film in such a way that these are joined firmly to one another at the fastening portions and the middle portion. In this way, the chambers in which the liquid foam material foams and solidifies are formed in the hollows.

The foregoing method for production of a sealing strip may also be implemented as an endless process. In particular, this may take place on a belt that has the shape of the press punch.

BRIEF DESCRIPTION OF THE DRAWINGS

Embodiments will be explained in more detail hereinafter on the basis of the attached drawings, wherein:

FIG. 1 shows a schematic diagram of a cross-sectional profile of a sealing strip, that has not been installed, according to a first embodiment.

DESCRIPTION OF THE EMBODIMENTS

Figure 2A:
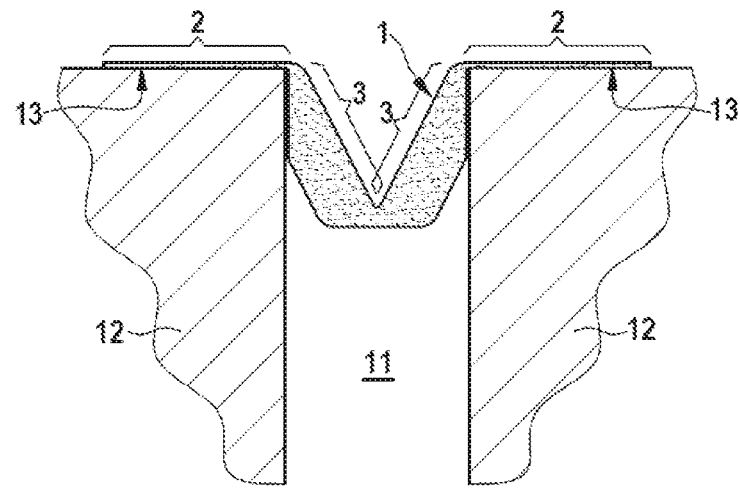
FIGS. 2a and 2b show sealing strips introduced into joints of different widths.

FIG. 1 illustrates a cross-sectional profile of an elongated sealing strip 1. The cross-sectional profile has two flat external fastening portions 2, between which two thicker sealing portions 3 are disposed. Sealing portions 3 are separated from one another by a predetermined bending site 4 with thinner thickness.

Fastening portions 2 are formed substantially from a thin flexible material or material composite. Thus fastening portions 2 may be adapted, both in longitudinal direction and in transverse direction of sealing strip 1, to various contours of building elements, such as, for example, building components, especially walls, ceilings and the like. On the whole, sealing strip 1 is formed from a film material 9, which may be equipped or reinforced with a screen or mesh or another reinforcing structure for structural reinforcement.

Figure 2B:
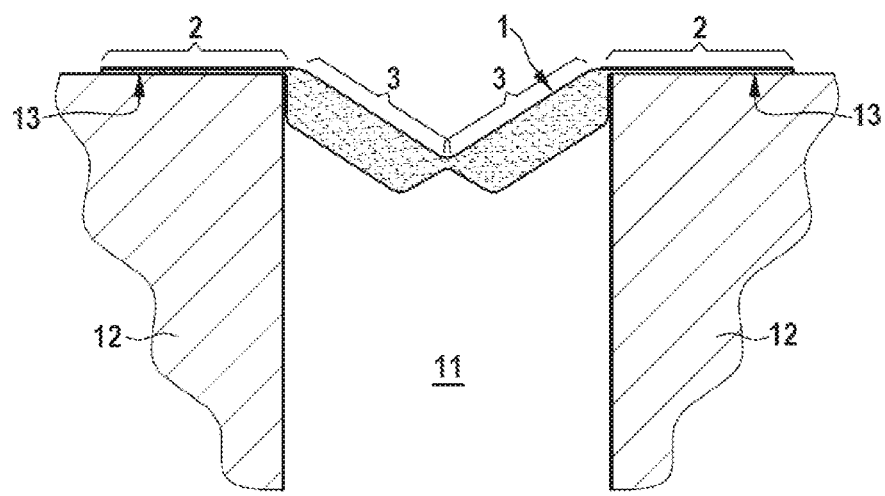

FIGS. 2a and 2b respectively show a joint 11 between two building elements 12, in which sealing strip 1 is affixed. As shown in FIGS. 2a and 2b, sealing strip 1 is affixed in or above a joint 11 in such a way that the absorption of relative movements between the two building elements 12 spaced apart from one another is not hindered. In this situation, fastening portions 2 are fastened to rim regions 13 of building elements 12, which adjoin joint 11.

Sealing portions 3 are respectively designed as chambers 6 formed between two film portions 5 (FIG. 1), wherein the chambers 6 are filled with a foam 10. Foam 10 is flexible, elastic and easily compressible, and preferably is equipped with a fire-resistant and/or intumescent material or is formed therefrom. Foam 10 may be provided with a polyurethane foam and in particular have a density between 40 and 400 kg/m$^3$.

The cross sections of chambers 6 may have a width that tapers toward predetermined bending site 4, so that predetermined bending site 4 is formed by a recess 7, that is formed between sealing portions 3 and has approximately wedge-shaped cross section. The cross-sectional profile of sealing strip 1 is formed evenly, substantially on a first main side S1, so that chambers 6 of sealing portions 3 on an oppositely disposed main side S2 protrude beyond the face of fastening portions 2 on second main side S2.

Fastening portions 2 may be equipped on second main side S2 with adhesive areas 8, with which sealing strip 1 can be adhesively bonded onto corresponding rim regions 13 of building elements 12, so that sealing portions 3, as shown in FIGS. 2a and 2b, project into a joint 11 disposed between them. It is obvious that rim regions 2 of sealing strip 1 are adhesively bonded to rim regions 13 of building elements 12 in such a way that the transitions between fastening portions 2 and associated sealing portion 3 are disposed at the rims of building elements 12 bounding joint 11. In this way, adhesive areas 8 are adhesively bonded completely onto rim regions 13 of building elements 12, and sealing portions 3 project completely into joint 11 between building elements 12. In the case of increasing spacing between building elements 12 or of increasing width of joint 11, as illustrated in FIG. 2b, sealing portions 3 are able to spread apart without thereby causing joint 11 to become pervious.

Film material 9 of sealing strip 1 is preferably selected such that it has good adherence to foam 10. At least the surface of first main side S1 should be textured such that it can be coated with conventional wall paint.

Figure 3A:
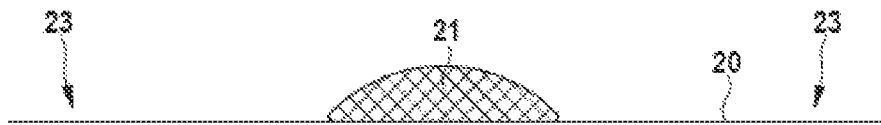
FIGS. 3a to 3c show process conditions for production of the sealing strip according to a first embodiment.
Figure 3B:
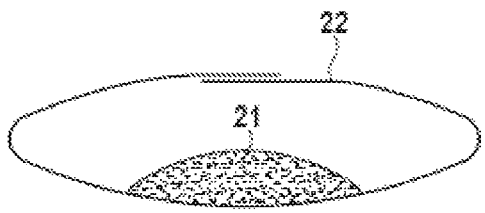
Figure 3C:
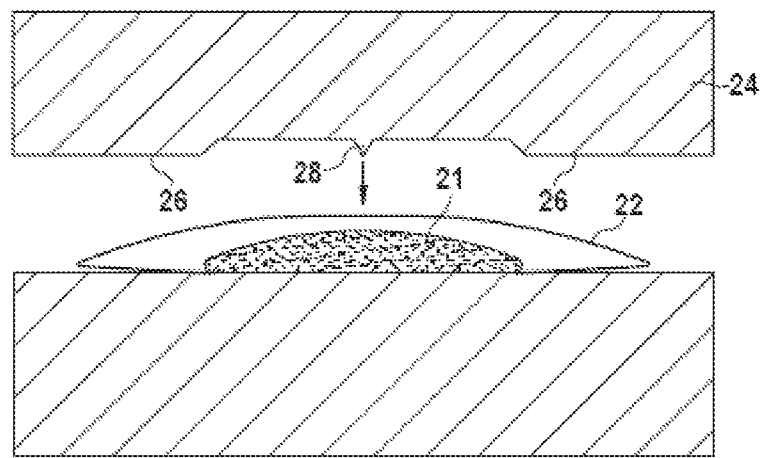

FIGS. 3a to 3c illustrate process conditions for production of a sealing strip 1 corresponding to the embodiment of FIG. 1. The method is based on a film tape 20, which can be welded by the effect of heat, for example, and which can be welded to itself. Film tape 20 may be formed from the following film materials: polyethylene, polypropylene, polyvinyl chloride, polystyrene, polyester, polyamide, polycarbonate, composite materials or similar synthetic materials. It is also conceivable for the film tape to be equipped with a screen or mesh structure, such as a structure of glass, fiber, textile or similar.

As shown in the cross-sectional diagram of FIG. 3a, a liquid film material 21, which for the time being has not foamed and solidified, is applied approximately onto a middle region of film tape 20, which extends along the longitudinal direction of film tape 20. Prior to foaming and solidification of foam material 21, the regions of film tape 20 on both sides of the applied foam material 21 are bent or folded on both sides over liquid foam material 21. In the process, side rims 23 of film tape 20 overlap one another, and so a film tube 22 extending in longitudinal direction L is formed with a strip of liquid foam material 21 introduced therein. This is shown in the cross-sectional diagram of FIG. 3b.

In an alternative embodiment, liquid material 21 is applied onto a region of film tape 20 that encloses a line extending in longitudinal direction with a spacing of approximately one quarter of its width from a lateral rim 23. Prior to foaming and solidification, the remaining larger portion of film tape 20 to the side of liquid foam material 21 is bent or folded on one side over liquid foam material 21, so that side rims 23 approximately overlap one another.

Thereby a film tube 22 extending in longitudinal direction can likewise be formed with a strip of liquid foam material 21 introduced therein.

After the folding-over to form film tube 22, this is fed to a forming punch 24, which compresses portions of film tube 22 together and welds them together with one another, for example by heat action, where oppositely disposed film regions bear on one another. Forming punch 24 is illustrated in FIG. 3c and, for example, has three pressing regions, which form or define the two fastening portions 2 of sealing strip 1 and the predetermined bending site 4 of sealing strip 1.

For this working step, film tube 22 is disposed in such a way relative to forming punch 24 that the strip of foam material 21 is disposed approximately centrally relative to ridge-shaped pressing region 28, which is used to form predetermined bending site 4. Thereby the substantially ridge-shaped pressing region 28 for predetermined bending site 4 presses approximately in the middle of elongated film tube 22, in order to divide the still liquid foam material 21 approximately in half. While being pressed together, film tube 22 spreads out, and so lateral pressing regions 26 of forming punch 24, which form the rim regions, press an upper and lower portion of film tube 22 onto one another, join them to one another and thereby form fastening portions 2 of sealing strip 1. Between pressing regions 26 for fastening portions 2, forming punch 24 is provided with two depressions, disposed on both sides of the pressing region for predetermined bending site 4, so that, during the pressing process, the foam material collects in the region of the depressions and forms sealing portions 3. At sealing portions 3, the film portions do not bear on one another but instead respectively form the chambers 6, in which approximately one half of the foam material 21 is respectively received.

During pressing, upper and lower film portions are pressed onto one another at pressing regions 26 and, for example, are welded to one another by heat action. In this way, chambers 6 are separated from one another and predetermined bending site 4 disposed between them is formed.

Alternatively, a thin layer of the foam material may remain between the rim regions while they are being pressed together, in order thereby to improve the stability of fastening portions 2. This can be achieved by increasing the quantity of introduced foam material 21, so that part of the liquid foam material 21 is forced underneath pressing regions 26 during pressing.

After pressing, fastening portions 2 may be equipped with an adhesive layer or with an adhesive area 8, especially an adhesive tape, on the side on which chambers 6 containing foam material 21 protrude, so that fastening portions 2 can be adhesively bonded to rim regions 13 of building element 12 during mounting of sealing strip 1.

Figure 4A:
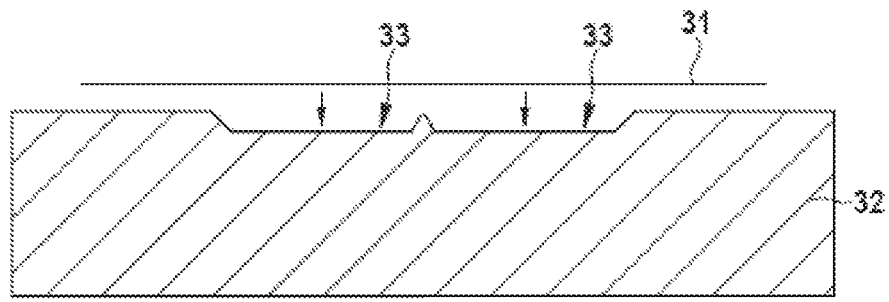
FIGS. 4a to 4c show process conditions of a method for production of a sealing strip according to a further embodiment.
Figure 4B:
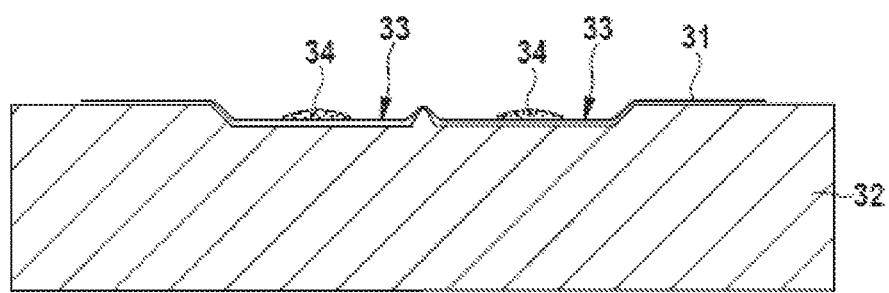
Figure 4C:
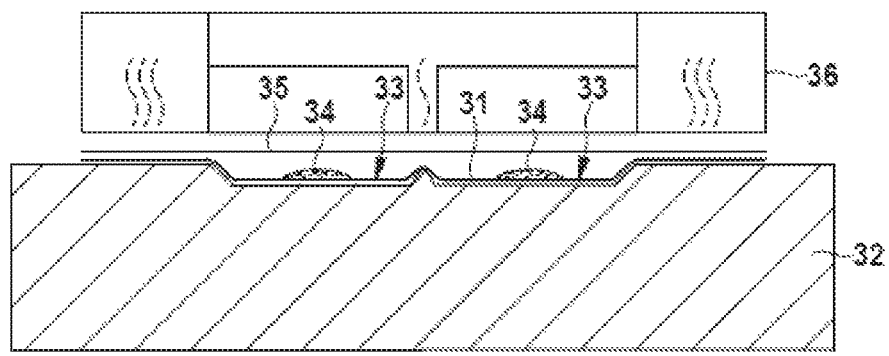

FIGS. 4a to 4c show process conditions of a further possible production process in cross-sectional diagrams. In this case, as shown in FIG. 4a, a first film tape 31 is placed on a forming punch 32, which is provided with two depressions 33 in the region of sealing portions 3 to be formed. In order to introduce first film tape 31 into depressions 33, it may be sucked into them, for example by means of vacuum.

Now, as shown in FIG. 4b, the two depressions 33 are respectively equipped with a strip, running in longitudinal direction, of a liquid foam material 34, after which a second film tape (not shown in FIG. 4b) is likewise affixed in longitudinal direction onto first film tape 31, so that closed chambers 6, in which liquid foam material 34 foams and solidifies, are formed in the region of depressions 33.

As shown in FIG. 4c, by means of heat action, e.g. using a heated press punch 36, first film tape 31 is welded together with second film tape 35 in the region of fastening portions 2 to be formed and in the region of predetermined bending site 4 to be formed, in order to form sealing strip 1 as illustrated by way of example in FIG. 1.

The invention claimed is:

1. A sealing strip for sealing a joint between two building elements, wherein the sealing strip extends in a longitudinal direction and in cross-sectional profile has two fastening portions, between which two separate adjacent sealing portions are provided that are separated from one another by a predetermined bending site running in the longitudinal direction,
   wherein the sealing portions each have a chamber filled with a compressible foam,
   the sealing strip is formed from a film material comprising upper and lower film portions; and
   said predetermined bending site is formed by welding by heat action, said upper and lower film portions.

2. The sealing strip according to claim 1, wherein the foam is provided with an elastic polyurethane foam.

3. The sealing strip according to claim 1, wherein the sealing portions are formed immediately adjacent to one another.

4. The sealing strip according to claim 1, wherein the sealing portions are tapered toward the predetermined bending site, in order to form a recess between the sealing portions.

5. The sealing strip according to claim 1, wherein the sealing portions are able to protrude only at a main face of the sealing strip.

6. The sealing strip according to claim 5, wherein the fastening portions are equipped with adhesive areas, on a side of the sealing strip on which the sealing portions also protrude.

7. The sealing strip according to claim 1, wherein the film material is equipped with structural reinforcement.

8. The sealing strip according to claim 1, wherein the film material completely envelops the sealing strip.

9. An arrangement comprising:
   a sealing strip according to claim 1, and
   a joint between two building elements,
   wherein the fastening portions of the sealing strip are adhesively bonded to the rim regions of the building elements adjoining the joint, so that the sealing portions project into the joint in a condition folded together at least partly around the predetermined bending site.

10. A method for producing a sealing strip, according to claim 1, comprising:
   providing an elongated film tape;
   introducing liquid, uncured foam material onto the film tape; bending the film tape over in a manner transverse to the longitudinal direction of the film tape, in order to form a film tube;
   pressing the film tube with a press punch, so that film portions overlapping one another at the fastening portions and at the predetermined bending site are joined to one another, and the foam material collects prior to curing in adjacent chambers, in order to form the sealing portions.

11. A method for producing a sealing strip, according to claim 1, comprising:
   providing an elongated first film tape in a forming punch having depressions adjacent to one another;
   applying liquid, uncured foam material in the depressions of the first film tape;
   applying a second film tape onto the first film tape, so that the film tapes are joined to one another at the fastening portions and along the predetermined bending site, and the foam material is enclosed in chambers formed by the depressions.

* * * * *